United States Patent
Annaberger et al.

(10) Patent No.: US 9,156,342 B2
(45) Date of Patent: Oct. 13, 2015

(54) VEHICLE COMPRISING A HOUSING OF AN ELECTRIC ENERGY STORE, SAID HOUSING BEING DESIGNED AS A SUPPORTING STRUCTURAL COMPONENT

(71) Applicant: Bayerische Motoren Werke Aktiengesellschaft, Munich (DE)

(72) Inventors: Leo Annaberger, Bad Heilbrunn (DE); Christoph Platz, Unterschleissheim (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 14/041,625

(22) Filed: Sep. 30, 2013

(65) Prior Publication Data

US 2014/0027193 A1 Jan. 30, 2014

Related U.S. Application Data

(63) Continuation of application No. PCT/EP2012/061389, filed on Jun. 15, 2012.

(30) Foreign Application Priority Data

Jun. 29, 2011 (DE) .......................... 10 2001 078 265

(51) Int. Cl.
*B60K 1/04* (2006.01)
*B62K 11/02* (2006.01)
*B62K 11/10* (2006.01)

(52) U.S. Cl.
CPC . *B60K 1/04* (2013.01); *B62K 11/02* (2013.01); *B62K 11/10* (2013.01); *B60Y 2200/12* (2013.01); *B62K 2202/00* (2013.01); *B62K 2204/00* (2013.01); *B62K 2208/00* (2013.01)

(58) Field of Classification Search
CPC ........... B62K 11/10; B62K 11/02; B60K 1/04
USPC ........................................................ 180/220
See application file for complete search history.

(56) References Cited

U.S. PATENT DOCUMENTS

| 5,207,288 A | 5/1993 | Ono |
| 5,577,747 A * | 11/1996 | Ogawa et al. ................. 180/220 |
| 5,584,510 A | 12/1996 | Thuliez |
| 6,015,022 A | 1/2000 | Thuliez |

(Continued)

FOREIGN PATENT DOCUMENTS

| AT | 204893 B | 8/1959 |
| AT | 208243 B | 3/1960 |

(Continued)

OTHER PUBLICATIONS

International Search Report (PCT/ISA/210) dated Jun. 15, 2012 with partial English translation (six (6) pages).

(Continued)

*Primary Examiner* — Kevin Hurley
(74) *Attorney, Agent, or Firm* — Crowell & Moring LLP

(57) ABSTRACT

A vehicle is provided having at least a front wheel, a rear wheel, an electrical machine which is configured for driving the rear and/or the front wheel, and multiple electrical storage devices which are accommodated in a storage housing. The storage housing forms a load-bearing component of a frame and/or a body of the vehicle.

17 Claims, 1 Drawing Sheet

(56) References Cited

U.S. PATENT DOCUMENTS

| | | | |
|---|---|---|---|
| 6,326,765 B1* | 12/2001 | Hughes et al. | 320/104 |
| 6,679,345 B2* | 1/2004 | Hirayama et al. | 180/65.31 |
| 7,255,191 B2* | 8/2007 | Baldwin et al. | 180/220 |
| 8,312,954 B2* | 11/2012 | Johnson et al. | 180/220 |
| 8,316,976 B2* | 11/2012 | Johnson et al. | 180/68.5 |
| 8,789,640 B2* | 7/2014 | Matsuda | 180/220 |
| 2002/0014366 A1 | 2/2002 | Turner | |
| 2005/0217910 A1 | 10/2005 | Yonehana et al. | |
| 2010/0018784 A1* | 1/2010 | Hoebel | 180/2.2 |
| 2013/0270024 A1* | 10/2013 | Matsuda | 180/220 |

FOREIGN PATENT DOCUMENTS

| | | |
|---|---|---|
| AT | 226088 B | 2/1963 |
| CN | 1676404 A | 10/2005 |
| DE | 26 02 949 A1 | 7/1977 |
| DE | 42 43 455 A1 | 6/1994 |
| DE | 696 02 964 T2 | 2/2000 |
| DE | 10 2005 052 307 A1 | 5/2007 |
| DE | 10 2008 011 851 A1 | 9/2009 |
| DE | 10 2009 038 834 A1 | 3/2011 |
| EP | 0 444 975 A1 | 9/1991 |
| EP | 0 868 338 A1 | 6/1999 |
| EP | 1 175 328 B1 | 9/2002 |
| JP | 2000-118469 A | 4/2000 |
| WO | WO 2008/106976 A1 | 9/2008 |
| WO | WO 2009/114154 A1 | 9/2009 |

OTHER PUBLICATIONS

German Office Action dated Mar. 9, 2012 with English translation (Ten (10) pages).

German Office Action dated Mar. 27, 2012 with English translation (Four (4) pages).

Chinese Office Action dated Jun. 3, 2015, with English translation (Fourteen (14) pages).

* cited by examiner

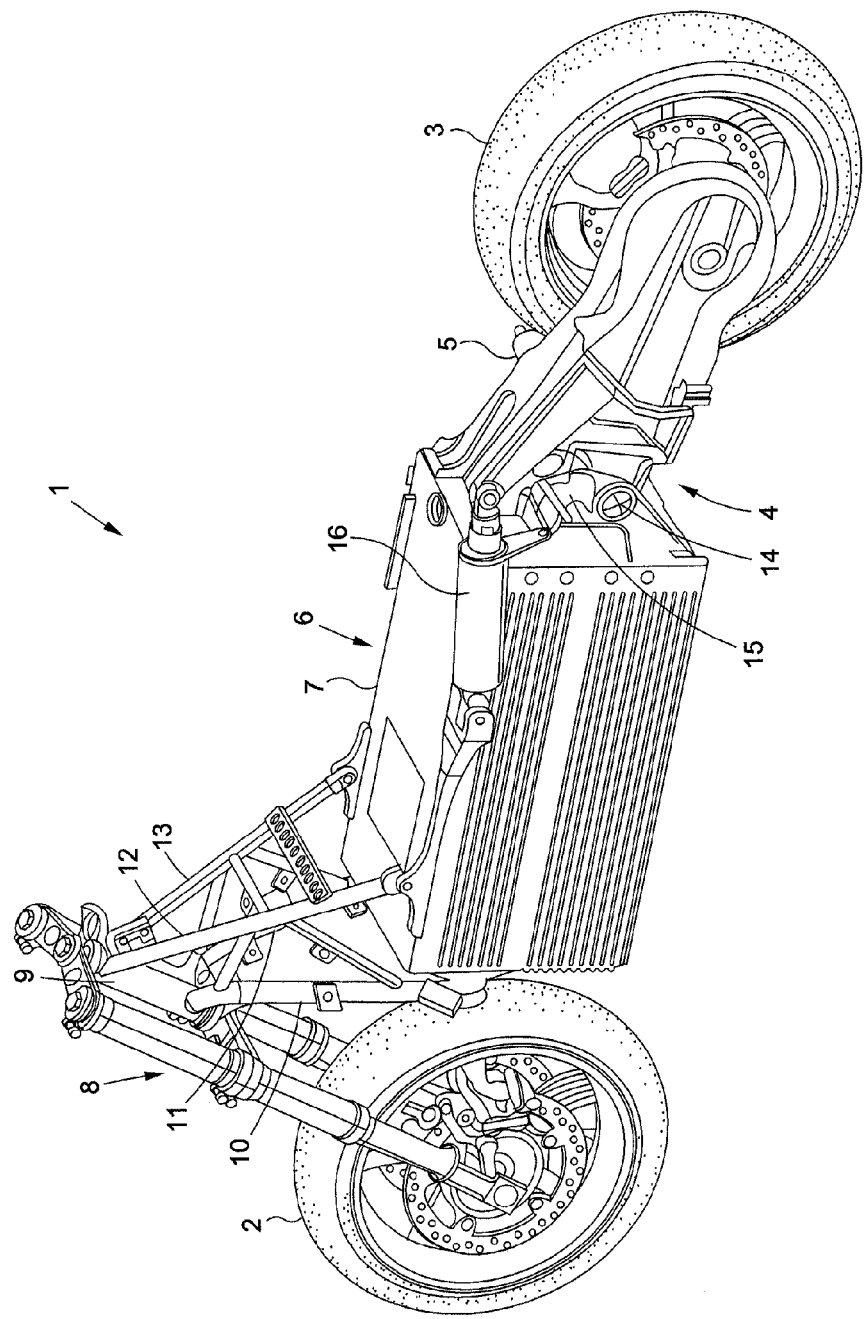

VEHICLE COMPRISING A HOUSING OF AN ELECTRIC ENERGY STORE, SAID HOUSING BEING DESIGNED AS A SUPPORTING STRUCTURAL COMPONENT

CROSS REFERENCE TO RELATED APPLICATIONS

This application is a continuation of PCT International Application No. PCT/EP2012/061389, filed Jun. 15, 2012, which claims priority under 35 U.S.C. §119 from German Patent Application No. DE 10 2011 078 265.6, filed Jun. 29, 2011, the entire disclosures of which are expressly incorporated by reference herein.

BACKGROUND AND SUMMARY OF THE INVENTION

The present invention relates to a vehicle having at least one front wheel, at least one rear wheel, and electric drive and an electrical storage unit having a housing which is a load-bearing component of the frame and/or body of the vehicle.

At present, vehicle manufacturers are increasingly focusing on vehicles having a hybrid drive or a purely electric drive. Such vehicles require a relatively heavy battery. The battery can be arranged, by way of example, in the undercarriage, in an intermediate vehicle floor, or in a "trunk" of the vehicle. Due to the high weight of the battery, the body and/or the frame of the vehicle must be accordingly given a rigid construction in the region thereof where the battery is housed.

The problem addressed by the invention is that of creating a vehicle wherein the electrical energy storage is integrated as well as possible into the body and/or into the frame of the vehicle.

The invention proceeds from an electrical storage which can consist of multiple storage devices. The term "storage device" particularly includes battery cells, capacitors, or other devices which are suitable and intended for the storage of electrical energy. The individual storage devices can be connected in parallel or in series. Multiple storage devices can be connected to each other to form a storage module. The electrical energy storage can have multiple storage modules connected to each other.

The storage devices are accommodated in a "storage housing." According to the invention, the storage housing is designed to be stable in such a manner that it can function as a load-bearing structural component of a body and/or a frame of a vehicle.

The term "storage housing" means a housing in which the storage devices of the electrical energy storage are accommodated. In contrast to conventional vehicle concepts, wherein the electrical energy storage is housed in a "compartment" of the vehicle body, the storage housing of the electrical energy storage according to the invention forms a load-bearing component of the vehicle body and/or the vehicle frame. The storage housing according to the invention is therefore an essential component of the vehicle body and/or the vehicle frame. If one would imagine dispensing with the storage housing, it would no longer be possible to have a "functional vehicle body" and/or a "functional vehicle frame." Accordingly, an exchange of the electrical energy storage and/or the storage housing would only be possible by destroying the vehicle body and/or the vehicle frame.

Therefore, the invention is primarily characterized in that the storage housing is used directly as a "load-bearing structural component," and is not merely inserted into a compartment of the frame or body, or installed thereon, as is the case in conventional vehicle concepts. As such, it is possible to save constructed space and weight, while having a small number of individual components.

The invention is particularly suited for use in two-wheel vehicles and/or motorcycles or motor scooters. However, the invention can also be used for three-wheel vehicles (so-called "tikes"), or four- or more-wheeled vehicles (e.g. passenger cars). The vehicle can be exclusively driven by an electrical machine (an electric motor), meaning that it is a purely electric vehicle (with no combustion engine).

According to the invention, all electrical energy storage devices in which electrical energy, the same being used to generate vehicle propulsion, are accommodated in the single storage housing (which is the only one configured in the vehicle). The storage housing is an independent component, wherein the connected frame or body components are "installed" on the same.

The storage housing according to the invention is preferably water-tight. This has the advantage that the configuration prevents water from the surroundings from penetrating into the individual storage devices.

An electronic controller which controls and/or regulates the charging and discharging of the electrical storage formed by the individual electrical storage devices (the battery management system) can likewise be housed in, or outside of, the storage housing.

The storage housing can be arranged, by way of example, between a front axle and/or a front wheel and a rear axle and/or a rear wheel of the vehicle. The front wheel and/or the rear wheel can be arranged in a manner allowing turning.

Because the storage housing forms a load-bearing component of the frame and/or the body of the vehicle, it supports forces and side loads resulting from the mass of the vehicle.

According to one implementation of the invention, the vehicle has a front frame-, body-, and/or chassis segment which is connected to the storage housing. A front wheel suspension which carries the front wheel, by way of example, can be arranged on the front frame- or body segment.

According to one implementation of the invention, the front frame-, body- and/or chassis segment has a steering wheel recess. The steering wheel recess can be formed by a steering head tube, for example, wherein a front wheel fork or a front wheel bearing is mounted on the steering head tube in a manner allowing turning. The steering head tube can be connected symmetrically to the storage housing, for example via four support tubes.

The storage housing can substantially have the shape of a cuboid which extends in the longitudinal direction of the vehicle. In the case of a two-wheel vehicle (e.g. a scooter), the storage housing can be designed in such a manner that its length, measured in the longitudinal direction of the vehicle, is larger than its width measured in the vehicle transverse direction. The larger the cross-section of the cuboid storage housing, the larger is its flexural and torsional strength. The higher it is possible to construct the storage housing (measured in the vertical direction of the vehicle), the larger is its flexural strength. Compared to conventional body or frame constructions, it is possible to achieve very high strength by means of such a "box-like storage housing." This has a very positive effect on the driving characteristics of the vehicle.

The storage housing can be made of metal, for example of aluminum or an aluminum alloy. It surrounds all storage devices and protects the same from damage, which is particularly important in the event of an accident and/or a collision.

According to one implementation of the invention, a rear wheel suspension which carries the rear wheel is connected to the storage housing. The rear wheel suspension can be connected to the storage housing in a hinged manner. It can be designed, by way of example, as a rear swinging fork which is connected to the storage housing (or to a flange attached thereto) via an articulated joint. The rear wheel suspension can be spring-supported on the storage housing via a spring strut. A damper device can be integrated into the spring strut or can be additionally configured.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 is an illustration of an electric scooter in accordance with an embodiment of the present invention.

DETAILED DESCRIPTION OF THE DRAWINGS

The electric scooter 1 has a front wheel 2 and a rear wheel 3. An electrical machine, which is not illustrated in greater detail here, is arranged in the area 4 of a rear swinging fork 5. The electrical machine is rotationally coupled to the rear wheel 3 via a transmission, which can be a belt drive, a chain drive, a driveshaft, or the like. The electrical machine drives the rear wheel 3 of the electric scooter 1.

An electrical storage 6 is arranged in the area between the front wheel 2 and the rear wheel 2 of the motor scooter 1. The electrical storage 6 can be a battery or capacitor arrangement, for example. It has a storage housing 7 in which the actual electrical storage devices which form the electrical storage are accommodated. The storage devices can be individual battery cells or capacitors which can be connected to each other in parallel or in series. Multiple such storage devices can be connected to make a storage module. Multiple such storage modules can also be accommodated in the storage housing 7.

As can be seen in FIG. 1, the storage housing 7 forms a load-bearing structural component of a frame and/or a body of the motor scooter 1. A front body- and/or frame segment is connected to a rear vehicle segment, which in this case is substantially formed by the rear swinging fork, via the storage housing 7, which forms a "crossbar-like central body- and/or frame segment" which is characteristic for a motor scooter. The crossbar-like central segment can serve as a platform for a motor scooter, on which the driver places his or her feet. As an alternative thereto, platform-like foot rests (not illustrated) can be attached on the left and the right sides of the central segment (on the two side walls of the storage housing 7). The storage housing 7 therefore forms an entirely central body- or frame module, wherein front and rear vehicle components are attached to the same.

The front wheel 2 of the motor scooter 1 is rotatably mounted on a front wheel fork 8. The front wheel fork 8 is mounted on the steering head tube 9 in a manner allowing turning. The steering head tube 9 is arranged in a symmetrical position with respect to the electrical energy storage 6. The steering head tube 9 is connected in this case to the storage housing 7 via four support tubes 10, 11, and/or 12, 13.

The rear swinging fork 5 is connected via an articulated joint 14 to a flange 15, the same being in turn fixed to the storage housing 6. The rear swinging fork 5 is furthermore connected to the storage housing 6 via a spring strut 16. The spring strut 16 enables the rear swinging fork to compress and extend with respect to the storage housing 6. A damper can be integrated into the spring strut 16. The damper could also be designed as a separate component (not illustrated).

If the vehicle concept shown in FIG. 1 is compared to other, conventional vehicle concepts for electrical vehicles, it is noticeable that a front frame, body, and/or chassis area, which is substantially formed in the embodiment shown here by the front wheel fork 8, the steering head tube 9, and the support tubes 10-13, is connected to a rear frame, body, and/or chassis area, which in this case is substantially formed by the rear swinging fork 5, exclusively by the storage housing 7. The storage housing 7 is therefore an indispensable component of the frame of the motor scooter shown in FIG. 1, wherein diverse chassis components can be directly or indirectly attached to it.

The storage housing 7 can be characterized as a "battery box" which is a load-bearing component of the electric scooter 1. The battery box forms a "main frame" of the vehicle, and has recesses for the front frame, a hatch frame (not illustrated), the rear swinging fork 5, and the electric drive motor.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle, having
at least one front wheel;
at least one rear wheel;
an electric drive machine configured to drive at least one of the at least one front wheel and the at least one rear wheel;
a plurality of electrical storage devices; and
a cuboid storage housing configured to receive the plurality of electrical storage devices,
wherein the cuboid storage housing is a load-bearing component of at least one of a frame and a body of the vehicle, and
wherein the cuboid storage housing is waterproof and prevents the penetration of water into an interior of the storage housing.

2. The vehicle according to claim 1, wherein the storage housing is connected to at least one of detachable frame, body and chassis components.

3. The vehicle according to claim 1, wherein the plurality of electrical storage devices received in the storage housing are configured to supply power to the electrical drive machine.

4. The vehicle according to claim 1, wherein the storage housing is arranged between the at least one front wheel and the at least one rear wheel, and is configured to support forces and torques applied to the storage housing by the vehicle.

5. The vehicle according to claim 4, wherein
the vehicle has at least one of front frame, body and chassis segments connected to the storage housing, and
a front wheel suspension which carries the at least one front wheel is arranged on the at least one of front frame, body and chassis segments.

6. The vehicle according to claim 5, wherein
the at least one of front frame, body and chassis segments includes a steering head tube, and
at least one of a front wheel fork and a front wheel bearing is located on the at least one of front frame, body and chassis segments in a manner permitting turning of the at least one of the front wheel fork and the front wheel bearing.

7. The vehicle according to claim 6, wherein the steering head tube is connected to the storage housing by a plurality of support tubes.

8. The vehicle according to claim 1, wherein a rear wheel suspension which carries the at least one rear wheel is arranged on the storage housing.

9. The vehicle according to claim 8, wherein the rear wheel suspension is located on the storage housing in a manner permitting turning of the at least one rear wheel.

10. The vehicle according to claim 8, wherein the rear wheel suspension comprises a rear swinging fork connected to the storage housing via an articulated joint and supported on the storage housing via a spring strut.

11. The vehicle according to claim 1, wherein that the electric drive machine drives the at least one rear wheel.

12. The vehicle according to claim 1, wherein the vehicle is a two-wheel vehicle.

13. The vehicle according to claim 12, wherein the two-wheel vehicle is a motor scooter in which the storage housing forms a crossbar central segment of the motor scooter.

14. The vehicle according to claim 1, wherein that the electrical storage devices are at least one of battery cells and capacitors.

15. The vehicle according to claim 1, wherein the cuboid storage housing forms a main frame of the vehicle.

16. The vehicle according to claim 1, wherein the cuboid storage housing supports forces and side loads resulting from a mass of the vehicle.

17. The vehicle according to claim 1, wherein the cuboid storage housing is integrally formed as a box-like structure.

* * * * *